US011677791B1

(12) United States Patent
Dunkel et al.

(10) Patent No.: US 11,677,791 B1
(45) Date of Patent: Jun. 13, 2023

(54) AUTOMATIC REMEDIATION OF THREATENED RESOURCES IN MANAGED CLOUD NETWORKS

(71) Applicant: Autocloud, Inc., Chicago, IL (US)

(72) Inventors: Tyler Dunkel, Chicago, IL (US); Tyson Kunovsky, Seattle, WA (US); Christopher Koning, Placerville, CA (US); Evelyn LaTour, Seattle, WA (US)

(73) Assignee: Autocloud, Inc., Chicago, IL (US)

( * ) Notice: Subject to any disclaimer, the term of this patent is extended or adjusted under 35 U.S.C. 154(b) by 0 days.

(21) Appl. No.: 17/820,903

(22) Filed: Aug. 19, 2022

(51) Int. Cl.
H04L 29/00 (2006.01)
H04L 9/40 (2022.01)

(52) U.S. Cl.
CPC .......... *H04L 63/205* (2013.01); *H04L 63/102* (2013.01); *H04L 63/105* (2013.01)

(58) Field of Classification Search
CPC .... H04L 63/205; H04L 63/102; H04L 63/105
See application file for complete search history.

(56) References Cited

U.S. PATENT DOCUMENTS 9,378,364 B1 * 6/2016 Weast ................. H04L 63/1433
11,019,101 B2 * 5/2021 Narayanaswamy .. H04L 63/104
(Continued)

FOREIGN PATENT DOCUMENTS

WO WO-2019156680 A1 * 8/2019

*Primary Examiner* — Don G Zhao
(74) *Attorney, Agent, or Firm* — Baker Botts L.L.P.

(57) ABSTRACT

A computer-implemented method is executed using a threat assessment server that is communicatively coupled via one or more networks to one or more different cloud computing service providers and comprises receiving first input data specifying a first cloud service account that is associated with two or more cloud computing instances and/or two or more cloud storage instances, the cloud computing instances or cloud storage instances being hosted at a first cloud computing service provider, the first cloud service account being from among one or more different cloud service accounts that are associated with the one or more different cloud computing service providers each hosting respective cloud computing instances and/or cloud storage instances; receiving second input data specifying an entry point identifier of a particular cloud resource from among the two or more cloud computing instances and/or two or more cloud storage instances; using a plurality of first network calls from the threat assessment server to the first cloud computing service provider, accessing an Identity and Access Management (IAM) role that is associated with the particular cloud resource and accessing one or more policies that are attached to the IAM role, the one or more policies specifying one or more other resources and one or more actions that are allowable with the one or more other resources; based on the one or more other resources and the one or more actions, digitally creating and storing a first entry in a list of affected resources that is stored in main memory of the threat assessment server; recursively executing a plurality of second network calls to access one or more other IAM roles and one or more other policies of the one or more other resources, and updating the list to create one or more second entries based on one or more service control policies that are associated with the first cloud service account; inspecting one or more networking rules defined in the first cloud service account to determine if network traffic is possible between a first resource and a second resource specified in the list of affected resources, and based on the inspection, digitally creating and storing a second list of source resources, destination resources, protocols and ports on which network traffic is possible; joining the first list and (Continued)

the second list and de-duplicating entries to create and store a joined list; based on the list, executing one or more updates to the networking rules to change access to one or more vulnerable resources in the joined list, and deploying the updates using one or more calls from the threat assessment server to cloud service tools of the cloud service provider.

20 Claims, 10 Drawing Sheets

(56) References Cited

U.S. PATENT DOCUMENTS

| | | | |
|---|---|---|---|
| 11,425,169 B2* | 8/2022 | Narayanaswamy | G06F 21/6245 |
| 2009/0286512 A1* | 11/2009 | Huber | H04L 63/0876 |
| | | | 455/411 |
| 2014/0223507 A1* | 8/2014 | Xu | H04L 67/10 |
| | | | 726/1 |
| 2015/0281250 A1* | 10/2015 | Miller | H04L 63/105 |
| | | | 726/1 |
| 2016/0248800 A1* | 8/2016 | Ng | G06Q 40/06 |
| 2018/0288063 A1* | 10/2018 | Koottayi | H04L 63/1416 |
| 2019/0245894 A1* | 8/2019 | Epple | G06F 21/56 |
| 2021/0084063 A1* | 3/2021 | Triantafillos | H04L 63/1433 |
| 2021/0160255 A1* | 5/2021 | Cherkas | H04L 63/20 |
| 2021/0226998 A1* | 7/2021 | Narayanaswamy | G06F 21/6209 |
| 2021/0377314 A1* | 12/2021 | Miller | H04L 63/102 |
| 2022/0294831 A1* | 9/2022 | Narayanaswamy | H04L 63/20 |
| 2022/0318002 A1* | 10/2022 | Copty | H04L 67/535 |

* cited by examiner

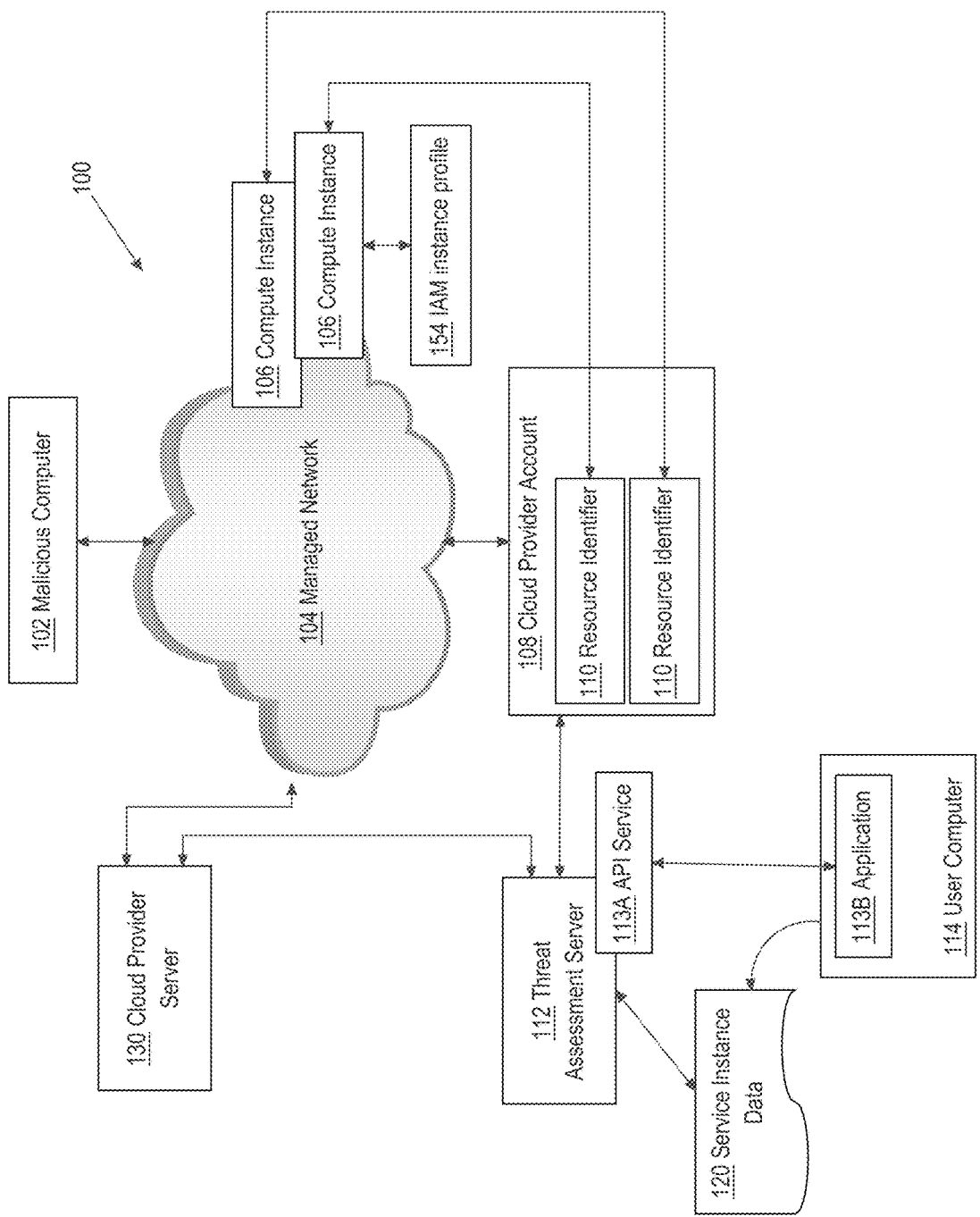

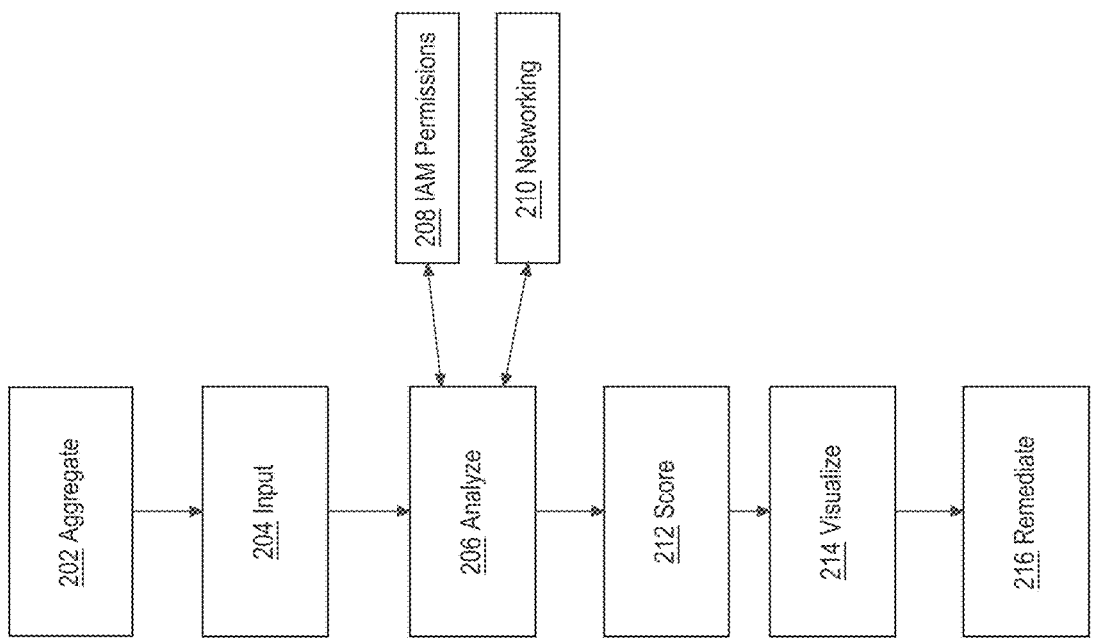

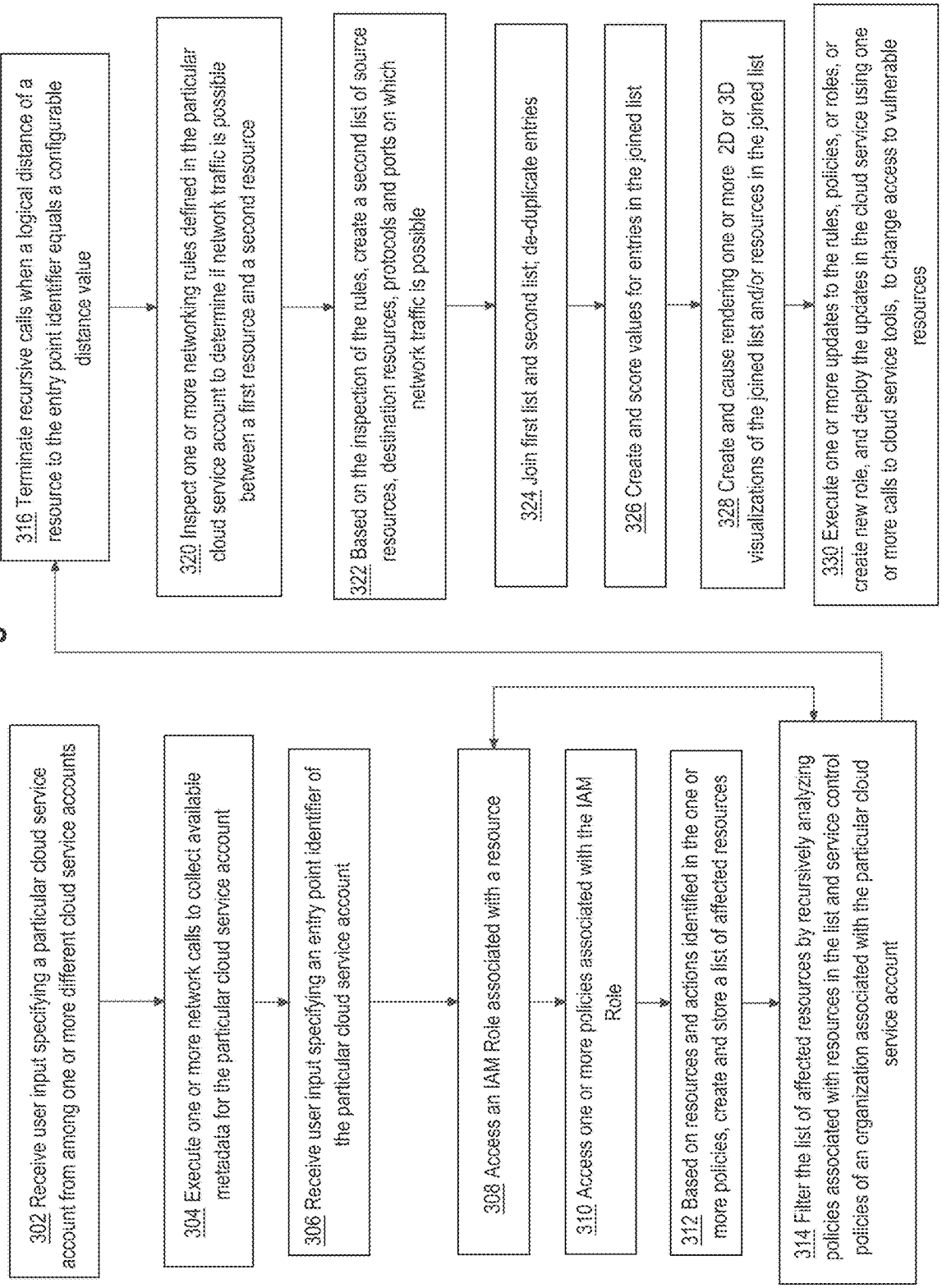

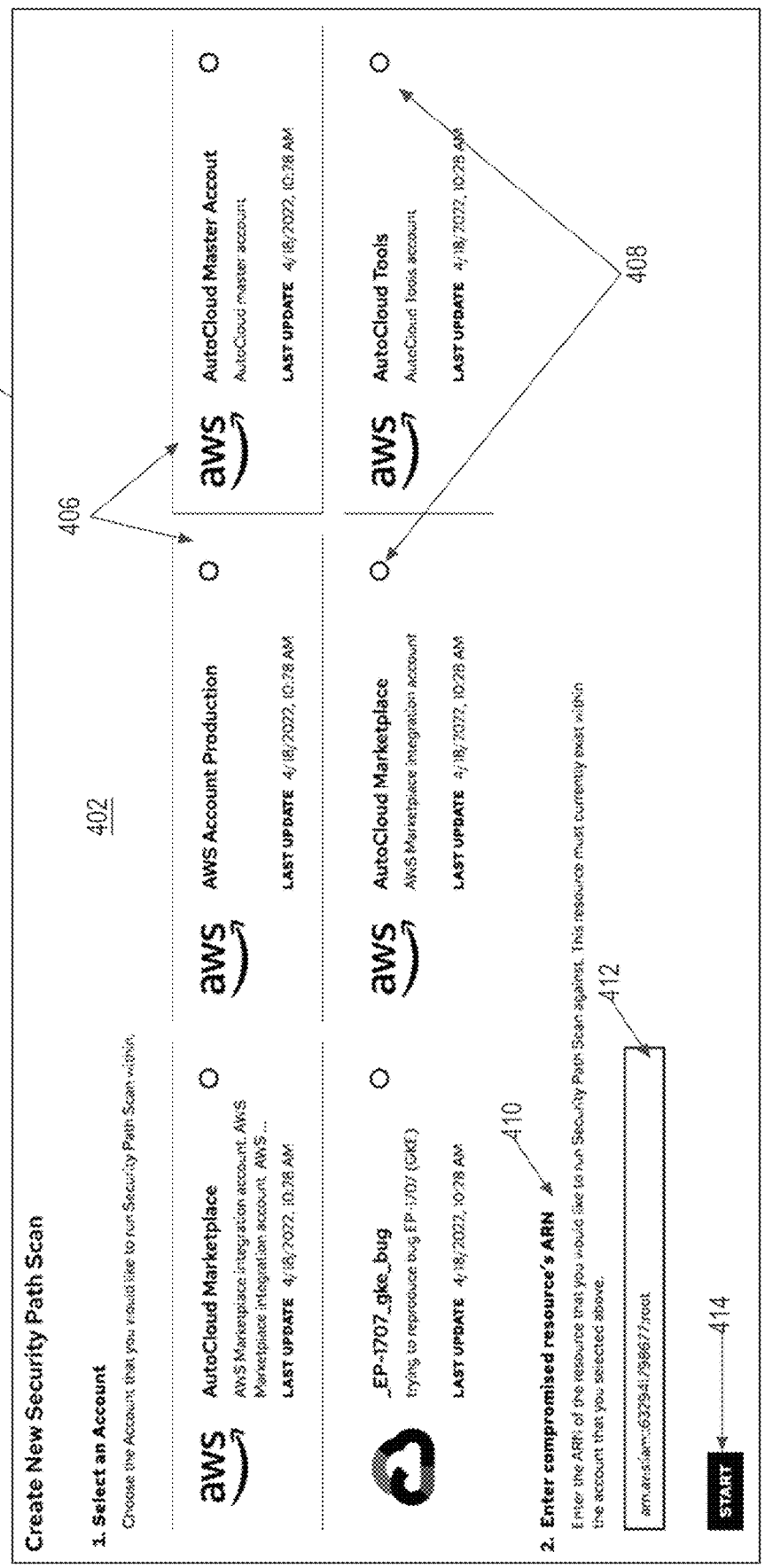

Fig. 4B

* AWS Account Name Report — 420

AWS Account: account
Searched ARN: 2034:7653:77xx
Started: 5/18/2023 10:01 AM
Time Elapsed: 26 min
Status: In progress

— 422

— 424

— 426

— 428

We're getting the latest data from your account — 429
This process can take from several minutes to hours, but we'll show ARNs as they come in.

| Security Path Scan 420 | | | | | |
|---|---|---|---|---|---|
| ACCOUNT NAME | AutoCloud Production | | STATUS | Complete | |
| ACCOUNT ID | 123455789110 | | STARTED | 10:21 AM 4/18/2022 | |
| SEARCHED ARN | arn:aws:iam::63294738677:root 421 | | TIME ELAPSED | 12 minutes | |

Search 424  | Group By 426 ▾ | 427

| DEGREE | ARN | ACCESS TO | ACCESSED BY | ACCESS TYPE | SCORE |
|---|---|---|---|---|---|
| ❶ 429 | arn:aws:iam::88791233867 | 29 | 2 | Network, IAM | 77 |
| ❷ | arn:aws:iam::88791233867 | 5 | 2 | Network | 35 |
| ❸ | Accessed by arn:aws:iam::1221967793157 (EC2 instance 5) | | | | |
| | ⌄ Networking (7) 430 | | | | |
| | arn:aws:iam::63294754431 | 2 | 1 | Network | 2 |
| | arn:aws:iam::45294777965 | 0 | 1 | Network, IAM | 25 |
| | arn:aws:iam::88791233867 | 0 | 5 | IAM | 83 |
| | arn:aws:iam::1221967793157 | 2 | 1 | Network | 67 |
| | arn:aws:iam::90909779357 | 2 | 3 | Network | 56 |

428  431  434

Download ▾

400

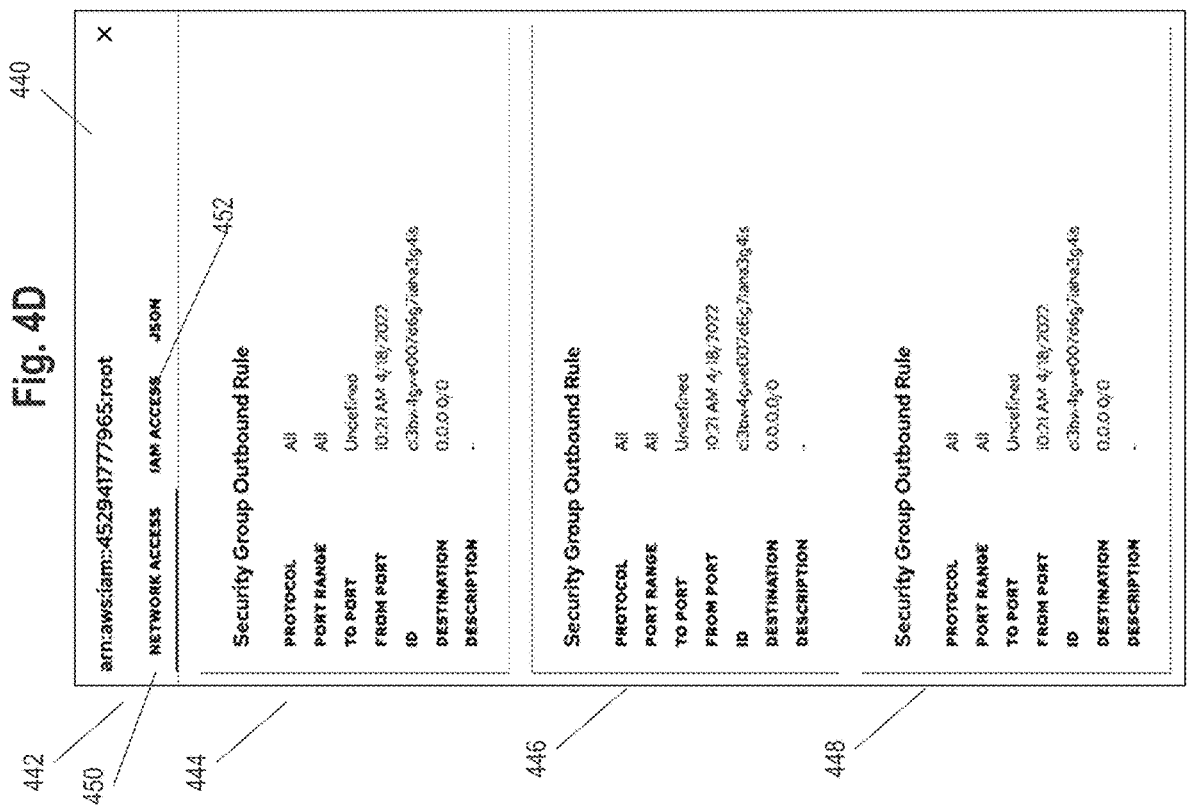

AUTOMATIC REMEDIATION OF THREATENED RESOURCES IN MANAGED CLOUD NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever.© 2022 Autocloud, Inc.

TECHNICAL FIELD

One technical field of the present disclosure is virtualized computing systems, including cloud-based datacenters. Another technical field is computer-implemented methods of automated analysis of network topologies and resources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Enterprises presently deploy complex distributing computing systems using virtual machine instances and virtual storage systems in cloud-based networks via cloud services providers. Examples include AMAZON AWS, MICROSOFT AZURE, and GOOGLE CLOUD. As enterprises deploy complex distributed systems using these services, managing the resulting network of virtual machine instances and storage becomes difficult. In fact, when a cloud service account is configured to automatically spin up and tear down virtual machine instances, determining what network resources exist in a particular account, at a particular time, can be difficult or can require human review of large dashboards or tables of data.

Malicious access to cloud-based networks continues to constitute a global problem. When an attacker accesses or disrupts a particular cloud-based resource, an enterprise that manages the resource typically wants to respond immediately. Seconds and minutes can matter when resources of a cloud service account are under attack. Furthermore, security analysts of the enterprise typically want to know not only which specific resources the attacker directly attacked, but also which resources have become vulnerable as a result of the attack. In complex cloud networks, determining all relationships between one node and other nodes, in terms of permissions and routable traffic, can be so time-consuming and complex that human analysis is practical within a reasonable time or with a period deemed necessary to respond to an attack.

Penetration testing systems and other methods and systems are known for assessing available privileges and access routes by or through on-premises based, legacy systems such as MICROSOFT WINDOWS SERVER using ACTIVE DIRECTORY based systems. However, contemporary cloud-based computing resources, including virtual compute instances, storage instances, and management instances, operate and use network routing and permissions data that differ markedly from on-premises and legacy systems and their sources of data, like MICROSOFT ACTIVE DIRECTORY. Consequently, systems designed to assess ACTIVE DIRECTORY permissions do not solve the problems addressed in this disclosure.

Yet network analysts need to know not just network entry points, but all resources such as virtual computing or storage instances that are reachable from the entry points via multiple logical levels or constructs, because attackers will seek to explore all reachable resources once they achieve initial access. Consequently, the field of cloud systems management has developed an acute need for improved automated means of detecting vulnerabilities across complex cloud networks and initiating automatic remediation operations.

SUMMARY

The appended claims may serve as a summary of the invention.

BRIEF DESCRIPTION OF THE DRAWINGS

In the drawings:

FIG. 1A illustrates a distributed computer system showing the context of use and principal functional elements with which one embodiment could be implemented.

FIG. 2 illustrates one example process flow for automatic remediation of threatened resources in managed cloud networks, in one embodiment.

FIG. 3 illustrates a second example process flow for automatic remediation of threatened resources in managed cloud networks, in one embodiment.

FIG. 4A illustrates an example computer display device that has rendered a graphical user interface of one embodiment.

FIG. 4B illustrates an example computer display device that has rendered a portion of a 2D visualization of affected resources.

FIG. 4C illustrates the computer display device of FIG. 4B that has rendered a further portion of a 2D visualization of affected resources.

FIG. 4D illustrates the computer display device of FIG. 4C that has rendered a further portion of a 2D visualization of affected resources with a rules detail window.

DETAILED DESCRIPTION

Figure 1B:
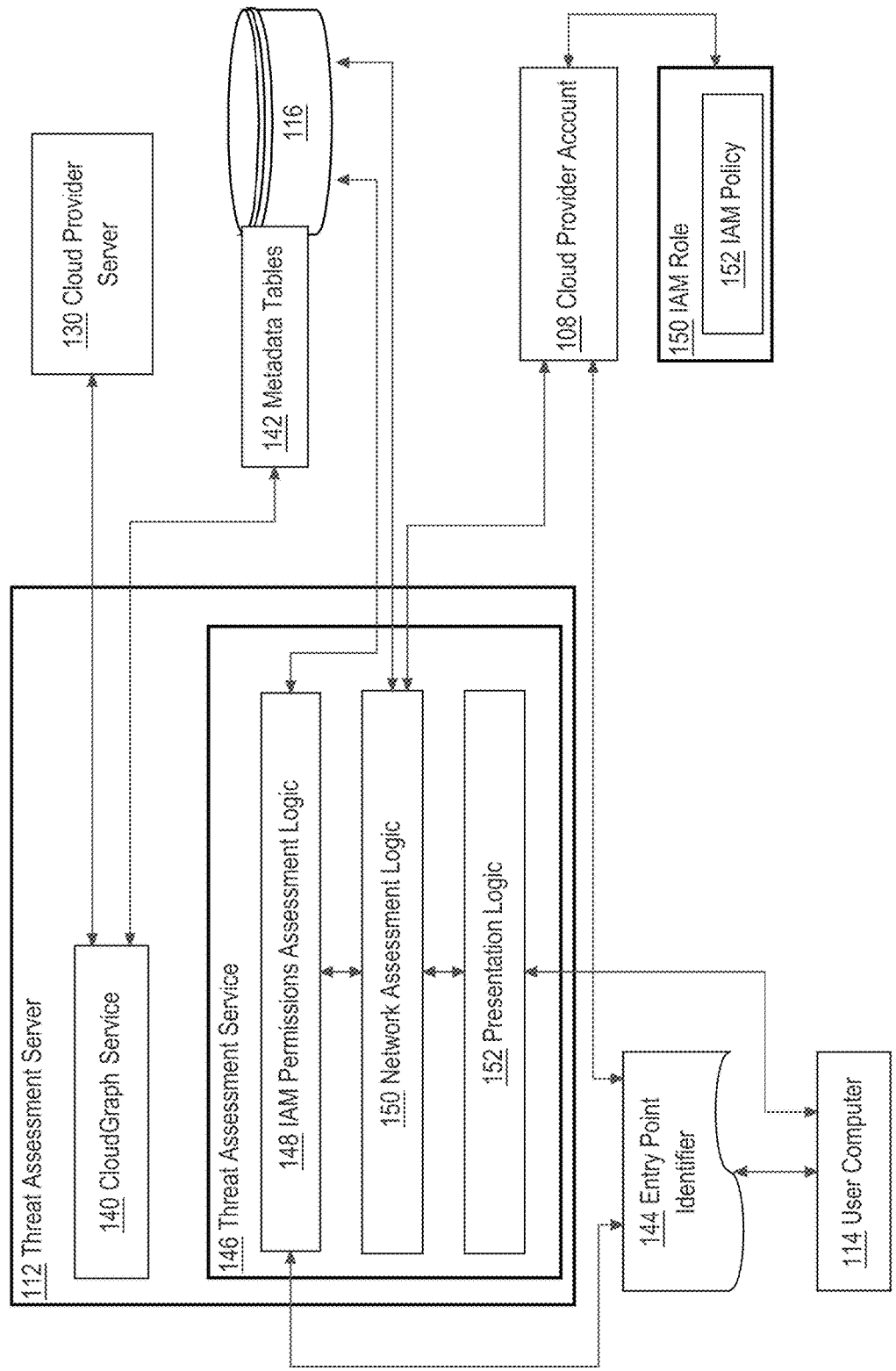
FIG. 1B illustrates functional elements of a threat assessment server and other elements of FIG. 1A with which the threat assessment server interoperates, in one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis of interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to more fully illustrate one or more aspects of the inventions. Similarly, although process steps, method steps, algorithms or the like may be described in a sequential order, such processes, methods and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of the more than one device or article.

The functionality or the features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

1. General Overview

Embodiments provide a set of machine-executable algorithms to answer questions about potential threat vectors after a malicious actor has gained access to virtual, cloud computing resource(s) within a cloud provider account or to test what malicious access might be possible. In one embodiment, a computer-implemented method analyzes the Identity and Access Management (IAM) permissions and networking connectivity within a specified account to determine what level of access is available from a certain entry point. The entry point can identify a cloud networking resource that is associated with an instance of a service. Based on the entry point, embodiments can automatically create a list of other service instances, in the same service or a different service, which are accessible from the entry point. The list can specify resource identifiers and allowable actions on the corresponding resources. Based on the list, an embodiment can implement automatic remediation or access limitation.

In one embodiment, the method is programmed to perform such analysis repeatedly and/or recursively for all cloud-based resources within a specified maximum degrees of logical distance or accessibility from the entry point. Resources specified in the list can be scored using a multitude of data points such as permissions level and degrees, to assist the user in prioritizing issues or to prioritize automatic remediation. Embodiments can provide a web platform to explore the results of executing the foregoing process, in a table format or a 3D rendering of a set of cloud resources and logical connections.

In various embodiments, the disclosure encompasses the subject matter of the following numbered clauses:

1. A computer-implemented method executed using a threat assessment server that is communicatively coupled via one or more networks to one or more different cloud computing service providers, the method comprising: receiving first input data specifying a first cloud service account that is associated with two or more cloud computing instances and/or two or more cloud storage instances, the cloud computing instances or cloud storage instances being hosted at a first cloud computing service provider, the first cloud service account being from among one or more different cloud service accounts that are associated with the one or more different cloud computing service providers each hosting respective cloud computing instances and/or cloud storage instances; receiving second input data specifying an entry point identifier of a particular cloud resource from among the two or more cloud computing instances and/or two or more cloud storage instances; using a plurality of first network calls from the threat assessment server to the first cloud computing service provider, accessing an Identity and Access Management (IAM) role that is associated with the particular cloud resource and accessing one or more policies that are attached to the IAM role, the one or more policies specifying one or more other resources and one or more actions that are allowable with the one or more other resources; based on the one or more other resources and the one or more actions, digitally creating and storing a first entry in a list of affected resources that is stored in main memory of the threat assessment server; recursively executing a plurality of second network calls to access one or more other IAM roles and one or more other policies of the one or more other resources, and updating the list to create one or more second entries based on one or more service control policies that are associated with the first cloud service account; inspecting one or more networking rules defined in the first cloud service account to determine if network traffic is possible between a first resource and a second resource specified in the list of affected resources, and based on the inspection, digitally creating and storing a second list of source resources, destination resources, protocols and ports on which network traffic is possible; joining the first list and the second list and de-duplicating entries to create and store a joined list; based on the list, executing one or more updates to the networking rules to change access to one or more vulnerable resources in the joined list, and deploying the updates using one or more calls from the threat assessment server to cloud service tools of the cloud service provider.

2. The method of clause 1, wherein inspecting one or more networking rules comprising inspecting one or more security group rules, network access control list rules, subnet CIDR blocks, and route table routes, and wherein executing one or more updates to the networking rules comprises executing one or more updates to the security group rules, network access control list rules, and/or IAM policies.

3. The method of clause 1, wherein executing one or more updates to the networking rules comprises creating and storing a new IAM role.

4. The method of clause 1, further comprising executing one or more second network calls from the threat assessment server to the first cloud computing service provider and receiving, in response, a plurality of metadata for the two or more computing instances and/or the two or more storage instances.

5. The method of clause 1, the entry point identifier comprising an AMAZON resource number (ARN).

6. The method of clause 1, further comprising performing the recursively executing only until a logical distance of one of the other resources to the entry point identifier equals a specified degree value.

7. The method of clause 4, the specified degree value being between "2" and "9".

8. The method of clause 1, further comprising: creating and storing a score value for each resource entry in the joined list; sorting the joined list based on a magnitude of the score value of each resource entry; performing the executing one or more updates in a priority order based on the score value of each resource entry.

9. The method of clause 1, further comprising, continuously on a streaming basis as the first list is updated, as the second list is created, and as the first list and second list are joined, creating and transmitting, to a user computer, presentation instructions which when rendered using the user computer cause the user computer to display a table of data for entries of resources in the first list, second list, and/or joined list, the table being updated continuously until the method completes.

Other aspects, features, and embodiments will become apparent from the complete description which follows.

2. Structural & Functional Overview

2.1 Distributed Computing System Example

FIG. 1A illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of cloud network threat assessment, resource visualization, and deployment of remediation measures. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Computer system 100 represents a malicious computer 102 that directs or could direct traffic to a managed network 104 having one or more compute instances 106 associated with a cloud provider account, a threat assessment server 112 that is communicatively coupled to the managed network, and a cloud provider server 130 that is communicatively coupled both to the managed network and to the threat assessment server. Arrows in FIG. 1 broadly represent any combination of one or more local area networks, wide area networks, campus networks, or internetworks using any of wireless or wired, satellite or terrestrial, network links using compatible internetworking protocols and stacks at each functional element. The managed network 104, cloud provider account 108, and cloud provider server 130 all can be associated with a provider of virtual computing resources or cloud service provider.

The malicious computer 102 represents an actual or theoretical source of an unauthorized access or other threat to the managed network 104. Importantly, embodiments do not require an actual attack or unauthorized access to the managed network; instead, embodiments are programmed to assess the managed network 104 starting from a point of entry in the network at which the malicious computer 102 might possibly achieve unauthorized access or initiate an attack. The managed network 104 can comprise any number of compute instances 106 in the form of virtual machines, virtual clusters, virtual storage systems, or other functional elements of a cloud computing system. The cloud provider account 108 stores plurality of resource identifiers 110, each of the resource identifiers corresponding to one of the compute instances.

The threat assessment server 112 can be implemented using another compute instance of the managed network 104, or using a computer or virtual machine instance in a different network, cloud service, datacenter, or location. The threat assessment server 112 can comprise an end station or server computer having the architecture shown in FIG. 5 and can be any of a laptop computer, desktop computer, workstation, server-class machine, or cluster. Or, the threat assessment server 112 can execute as a server process or application on another computer, including one of the compute instances 106 or using a virtual machine instance that is separate from the managed network 104 and/or in a different cloud network or service.

The cloud provider server 130 is programmed to implement one or more applications or services that expose application programming interfaces (APIs) capable of receiving and responding to calls of the threat assessment server 112 or from other clients. A user computer 114 can be communicatively coupled to the threat assessment server 112 in a client-server relationship. A single user computer 114 appears in FIG. 1A to illustrate a clear example, but practical embodiments can operate with hundreds to thousands of user computers depending on the processing resources of the threat assessment server 112. The user computer 114 can instruct the threat assessment server 112 to initiate execution and can provide one or more data items that the threat assessment server requires to assess threats or vulnerabilities of the managed network 104. The threat assessment server 112 can be programmed, after executing threat assessment operations, to create and cause rendering one or more visualizations of resource data and/or threat data using a graphical user interface (GUI) at the user computer 114.

In some embodiments, the threat assessment server 112 can host or execute an API service 113A that is configured to receive and service API calls from a compatible application 113B that the user computer 114 hosts or runs. Or, the application 113B can be a web-based application at a server computer separate from the threat assessment server 112, and the user computer 114 can access the web-based application using a browser.

The threat assessment server 112 is programmed to receive from user computer 114 information sufficient to enable the threat assessment server to access the managed network and one or more compute instances 106 or other resources. In some embodiments, as further described in other sections, user computer 114 supplies service instance data 120 (FIG. 1A) to the threat assessment server 112 to enable the threat assessment server to initiate assessment of the managed network 104 at a particular resource of the managed network that is specified in the service instance data, as detailed in other sections.

FIG. 1B illustrates functional elements of a threat assessment server and other elements of FIG. 1A with which the threat assessment server interoperates, in one embodiment. Threat assessment server 112 can be programmed using a CLOUDGRAPH service to establish network communications to cloud provider server 130 via one or more API calls and to retrieve data relating to the managed network 104, storing values relating to compute instances 106 and other elements of the network in one or more metadata tables 142 of a data repository 116. CLOUDGRAPH comprises a set of open-source programs that are available, at the time of this writing, at the domain CLOUDGRAPH.DEV on the open internet. Generally, CLOUDGRAPH comprises a set of programs capable of retrieving and structuring multi-environment, multi-cloud data into a standardized, type-safe format. The data repository 116 can be implemented using a relational database server, a no-SQL database, an object database, or a flat file system. In one embodiment, metadata tables 142 reside in an S3 bucket.

The acronym IAM refers to Identity and Access Management. As of this writing, all the largest cloud providers by market share use IAM to provide access to service resources within an account or organization. Threat assessment server 112 can be programmed to host a threat assessment service 146 comprising a plurality of sequences of stored program instructions that can be organized as IAM permissions assessment logic 148, network assessment logic 150, and presentation logic 152. Other embodiments can implement functionally equivalent instructions as a monolithic application or using methods, functions, modules, services, microservices, or other units of execution that are different than shown in FIG. 1B. Generally, the IAM permissions assessment logic 148, network assessment logic 150, and presentation logic 152 embody a set of algorithms to answer questions about potential threat vectors after the malicious computer 102 has gained access to one or more of the compute instances 106 and/or other resource(s) within the cloud provider account 108, and to score and visualize affected or potentially affected resources.

In one embodiment, the IAM permissions assessment logic 148 is programmed to analyze IAM permissions and networking within a specified cloud provider account to determine what level of access is available from a certain entry point for proactive access limitation. The IAM permissions assessment logic 148 can be programmed to receive a unique entry point identifier 144, such as an Amazon Resource Name (ARN), which is tied to an instance of a service, such as an EC2 compute instance, within the cloud provider account 108. The IAM permissions assessment logic 148 is programmed to execute elements of the process of FIG. 2 and/or FIG. 3 to create a list of other service instances, which could be another EC2 or a different service entirely, which are accessible from the origin. The network assessment logic 150 is programmed to assess routes or paths of network traffic that are possible between an affected resource and another potentially affected resource; recursive call techniques can be used to obtain and assess logical connectivity of multiple resources up to an arbitrary level of logical distance from the resource that was specified using entry point identifier 144. The network assessment logic 150 is programmed to update and filter the list generated by the IAM permissions assessment logic 148 and to score entries in the updated and filtered list.

The presentation logic 152 can be programmed to access the updated and filtered list, and other functional elements of the threat assessment server 112, and to generate and transmit presentation instructions that the user computer 114 can render in a graphical user interface, using a browser or a compatible application or app. The presentation logic 152 can be programmed to generate forms, GUI widgets, tables, and/or 3D renderings of polyhedrons that represent the compute instances 106 or other resources and network paths between them, as further described in other sections.

2.2 Processing Method—First Example

FIG. 2 illustrates one example process flow for automatic remediation of threatened resources in managed cloud networks, in one embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

At block 202, the threat assessment server 112 is programmed to execute an aggregate step. In an embodiment, the threat assessment server 112 is programmed to initiate execution of the CLOUDGRAPH service 140 to invoke a software development toolkit (SDK) or call APIs of the cloud provider server 130 to collect metadata into metadata tables 142. Examples of metadata can include an IP address on one or more services that are available in the managed network 104 or with the cloud provider. In some embodiments, separate user input supplies one or more access keys to the threat assessment server 112 and the server presents the keying material to the cloud provider server 130 to authenticate itself as a condition of obtaining the metadata. Metadata tables 142 can store data that can be organized as a logical graph of nodes connected by edges and representing all elements that the cloud account has defined or uses.

At block 204, the threat assessment server 112 is programmed to execute an input step in which the system receives, from user computer 114, a unique resource identifier that identifies a computing the instance in the managed network 104 to simulate as an entry point of a malicious actor.

At block 206, the threat assessment server 112 is programmed to execute an analyze step 206. In an embodiment, the analyze step 206 comprises the parallel execution of an IAM permissions operation 208 and a networking operation 210 using the metadata collected in the aggregate step of block 202. Thus, analyze step 206 is programmed to use IAM permissions data and networking data to determine the extent to which the entry point of block 204 could result in access to other resources of the managed network 104. The availability and use of IAM permissions data typically is specific to cloud-based compute, storage, and other processing resources and not available or usable in penetration testing of on-premises based, legacy systems such as MICROSOFT WINDOWS SERVER using ACTIVE DIRECTORY based systems.

At block 212, the threat assessment server 112 is programmed to execute a score step. In an embodiment, the threat assessment server 112 is programmed to compile a list of potentially affected services and resources and to determine a score value for each of the services and resources. In one embodiment a score value comprises an algorithmic combination of the following:

1. The degree value of the resource, representing the logical distance of the resource to the entry point. In an embodiment, a higher degree value results in a lower-priority score value since a higher degree value indicates greater difficulty for an attacker to reach the resource because the attacker must first access intermediary resources. A lower-priority score value can be larger in magnitude; thus, a score value of "10" could represent a lowest priority or lowest risk and "1" could be highest.

2. A first qualitative risk value derived from the IAM permissions value of the resource. For example, if the resource allows a write action, the first qualitative risk value is set higher or weighted higher because the magnitude of potential damage is higher. If the resource allows only a read action, the qualitative risk value is made lower.

3. A second qualitative risk value based on what degree of network traffic can be sent. For example, a resource that is associated with routing table values that allow traffic only on port "443" can result in a lower second qualitative risk score because that kind of traffic is deemed lower risk, whereas a resource that can send traffic on port "22" and potentially permit Secure Shell (SSH) access can result in a higher qualitative risk score.

A final score can comprise a weighted arithmetic mean of the preceding score components where, for example, the first qualitative risk score is weighted higher than the other two components. Score values can offer assistance in prioritizing remediation steps and/or scheduling automatic remediation operations.

At block 214, the threat assessment server 112 is programmed to execute a visualize step. In an embodiment, the threat assessment server 112 is programmed to provide a web platform with which user computer 114 can explore the results of an assessment scan using tables or 3D renderings of compute instances 106 or other resources of the managed network 104.

2.3 Processing Method—Second Example

FIG. 3 illustrates a second example process flow for automatic remediation of threatened resources in managed cloud networks, in one embodiment.

At block 302, the threat assessment server 112 is programmed to receive user input specifying a particular cloud service account from among one or more different cloud service accounts.

At block 304, the threat assessment server 112 is programmed to execute one or more network calls to collect available metadata for the particular cloud service account. For example, the threat assessment server 112 can transmit calls using CLOUDGRAPH service 140 to cloud provider server 130 and receive, in responses, available metadata for the particular cloud service account 108. At block 306, the threat assessment server 112 is programmed to receive user input specifying an entry point identifier of the particular cloud service account 108.

The threat assessment server 112 can be programmed to receive the user input of block 302, block 306 in a graphical user interface, and FIG. 4A illustrates an example computer display device that has rendered a graphical user interface of one embodiment. A computer display device 400 can receive presentation instructions to render, or display using an app, causing presentation of a graphical user interface 402 that is configured to receive data specifying an account and an entry point. GUI 402 displays a plurality of account tiles 406, each representing a different cloud provider account 108. Each of the account tiles 406 can correspond to a record stored in metadata tables 142 or other tables of data repository 116 and associated with a master account, in the threat assessment server, of the user computer 114 or a user of that computer.

In one embodiment, which is useful when the user computer 114 interoperates with a plurality of different cloud provider accounts 108 of multiple different cloud providers, the GUI 402 can include a provider selection widget programmed as a pull-down menu. In an embodiment, provider selection widget is programmed with multiple selectable values, each value specifying a different cloud service. In response to a selection with the widget, the GUI 402 can be programmed to filter the account tiles 406 and update the display to show only account tiles for cloud providers that correspond to the value that was selected using the widget. Or, the GUI 402 can be programmed to populate the screen with account tiles 406 for cloud providers based on data obtained from the metadata obtained at block 304, without an express user selection.

Each of the account tiles 406 comprises an account selection control 408, which can be programmed as a radio button. In an embodiment, selecting a particular account selection control 408 of a particular account tile 406 signals that the corresponding account is to be used in subsequent processing.

GUI 402 further comprises an entry point region 410 that is programmed with a text box or numeric data entry field 412 to receive user input specifying an identifier of a particular resource of the cloud that was selected using a control 408. In one embodiment, the field 412 can be programmed to automatically complete a data value based upon the metadata that was retrieved for a particular cloud service account; for example, metadata retrieved at block 304 (FIG. 3) can include a list of all ARNs that are known in the particular cloud service account and field 412 can auto-complete a particular ARN value in response to user input specifying one or more digits matching the value. In some embodiments, the field 412 can be programmed with format rules or a data type value that requires entering data in a particular format. FIG. 4A shows an example in which the field 412 requires entering twelve (12) numeric digits divided in three groups of four. Other embodiments can use different fields, rules, or formats to constrain data that is entered in the field.

In an embodiment, GUI 402 comprises a START widget 414, such as a selectable button. In response to receiving input specifying a selection of the widget 414, the GUI 402 is programmed to form a payload for a network message and to transmit or post the message to the threat assessment service 146. The payload includes account data corresponding to the account tile 406 for which a control 408 was selected, and the identifier data of field 412. In this manner, FIG. 4A provides a GUI that is configured to receive data specifying an account and an entry point and to supply the data values to threat assessment service 146 and its functional components.

Block 308 initiates a series of steps to assess IAM permissions. A user, program, or service must receive an express grant of IAM permission to access an instance to perform write actions against that service, such as add/modify/delete data or add/modify/delete instances of that service.

As an example, assume that a service is programmed to read the data within a database table that is hosted on the AWS RELATIONAL DATABASE SERVICE (RDS). Certain service instances, such as EC2, are given permission to interact with other services within AWS through an IAM Role 150 (FIG. 1B). An IAM Role is a digitally stored association of data in the cloud provider account 108 that a user or service assumes, to perform actions that are explicitly defined within a set of IAM policies 152 that are attached to the Role.

For example, an EC2 instance such as compute instance 106 might have an IAM Role 150 that the instance can assume, through an IAM instance profile 154 (FIG. 1A), that allows the instance to add or read a file in a SIMPLE STORAGE SERVICE (S3) bucket. If the malicious computer 102 gains access to the cloud provider account 108 by taking control of the instance 106, the malicious computer also potentially gains the ability to perform any of the actions allowable to that instance through its attached IAM Role 150. That ability could be problematic, for example, if the IAM Role 150 allows the compute instance 106 to read any object in any S3 bucket found within the cloud provider account 108. The malicious computer 102 could then use this permission to access sensitive data containing personally identifiable information (PII).

In an embodiment, the IAM permissions assessment logic 148 is programmed to interpret each IAM policy 152 that is attached to an IAM Role 150 to determine what access is possible. An IAM policy 152 can specify permissions or actions for one or more identifiers or ARNs, and can be structured as an identifier of a service name and an action name that is allowed or disallowed; an example would be an S3 bucket and data specifying a put object action or get object action. IAM policy 152 can specify the foregoing elements using wildcard values to encompass a range of items; for example, an ARN field could be specified as "*" to encompass any ARN value. In an embodiment, the IAM permissions assessment logic 148 is programmed to further determine what other services are accessible, what actions are possible on those services such as whether access is read-only or includes write permission.

In an embodiment, at block 308, the threat assessment server 112 is programmed to access an IAM Role that is attached to the resource corresponding to the entry point identifier that was received at block 306. At block 310, the threat assessment server 112 is programmed to access and collect all of one or more policies that are attached to or associated with the IAM Role. The policies explicitly specify what resources the role can access and what actions the role can perform on each resource. For example, sets of actions can be specified using wildcard characters (*) to reference multiple actions at once, as well as sets of resource identifiers, explicitly or using wildcards.

In an embodiment, at block 312, the threat assessment server 112 is programmed to create and store a list of affected resources, based on the resources and actions that are identified in the one or more policies of block 310. A first list of resources can be created and stored in data repository 116, or in main memory. The first list comprises potentially affected resources for the role that was accessed at block 308. The list can specify resource identifiers of resources that are reachable, and allowable actions on the corresponding resources.

In an embodiment, at block 314, the threat assessment server 112 is programmed to filter the list of affected resources by recursively analyzing policies associated with resources in the list and service control policies of an organization associated with the particular cloud service account. In an embodiment, the threat assessment server 112 is programmed to filter the list by recursively analyzing any policies attached to specific resources as well as analyzing any Service Control Policies (SCP) attached to an organization in which the cloud provider account 108 was created.

If the malicious computer 102 gains access to the managed network from an entry point specified in the entry point identifier 144, the malicious computer typically investigates two issues. First, the malicious computer 102 will seek to determine what sensitive data it can read or write. Second, it will seek to determine what other systems it can access, sometimes merely to determine how much of a cloud system it can compromise. For example, if the malicious computer 102 can access EC2 "A" having an IAM Role that grants access to EC2 "B," then the malicious computer also can perform any actions that are allowable through the IAM Role of EC2 "B."

In an embodiment, the threat assessment server 112 is programmed to traverses the graph of a user's cloud services and IAM Roles, represented in FIG. 3 by a path connecting block 314 to 308. Thus, block 308, 310, 312, 314 represent direct and/or recursive traversal of a graph of network elements that could be compromised. In an embodiment, traversal occurs to a configurable depth level or degree of distance from the entry point 144 that was specified at block 306. Thus, at block 316, the threat assessment server 112 is programmed to terminate the recursive calls to inspect other resources when a logical distance of a particular resource to the entry point identifier equals a configurable distance value. The distance value can be stored in data repository 116, or in a configuration file, and specifies a number of steps, degrees, or other representations of logical distance from the entry point to another resource. An embodiment can enforce a default distance value that is hard-coded as a constant, or used if a configured distance value is unavailable or inaccessible. An example default degree value is "3". If the distance value is sufficiently high, then the user computer 114 can obtain a complete picture in data of what resources might be accessible through permissions from the entry point identifier. However, if the distance value or degree value is too high, then the user computer 114 may receive excessive data that is not capable of human comprehension in a reasonable time.

Block 320 initiates a series of steps directed to assessing network data to further evaluate the likelihood that the malicious computer 102 could access other resources. Networking analysis can comprise evaluating the network traffic or network path data within the cloud provider account 108 to determine if access could be achieved by sending traffic between two compute instances 106. For example, the steps starting at block 320 can be programmed to determine whether an EC2 instance can send HTTP requests to an RDS Cluster to request data. If an attacker can access an EC2 instance, the attacker typically will inspect network traffic capabilities or connectivity to determine, for example, that the EC2 instance can send traffic to a database such as an RDS instance; such an insight will lead the attacker to attempt to read data in the database. The attacker might inspect other elements of a cluster or other tables of a database instance that they can access.

In an embodiment, at block 320, the threat assessment server 112 is programmed to inspect one or more networking rules that are defined in the particular cloud service account 108 to determine if network traffic is possible between a first resource and a second resource. The analysis of block 320 can be based upon various cloud-native networking constructs to determine if network traffic can be sent between two services that will differ depending on the source service and the destination service. For example, different steps can be programmed to determine the network path between an EC2 instance and a LAMBDA serverless instance than between a LAMBDA serverless instance and an S3 bucket.

To illustrate a clear example, the present disclosure describes example steps useful to determine network access between two EC2 instances, which is a common scenario in practical virtual network deployments. The networking rules that are analyzed between two EC2 compute instances are security group rules, network access control list (NACL) rules, subnet classless inter-domain routing (CIDR) blocks, and route table routes. In an embodiment, the threat assessment server 112 is programmed to analyze the Security Groups, and their rules, for each EC2 as follows. To create a list entry for a destination EC2 as an affected resource, the source EC2 must have a security group outbound rule that explicitly allows traffic to either an IP address of the destination EC2, or allows traffic to a security group identifier that is attached to the destination EC2. Next, the converse case is analyzed. The destination EC2 must have a security group inbound rule that explicitly allows traffic from either the IP address of the source EC2 or allows traffic from a security group attached to the source EC2.

If the foregoing tests are true, then the threat assessment server 112 is programmed to determine the subnet that logically contains the source EC2. Further, the threat assessment server 112 is programmed to inspect the NACL attached to the subnet of the source EC2, and determine whether the NACL defines an outbound rule that explicitly allows traffic to the IP address of the destination EC2. The NACL also will specify what ports and protocols are allowable to the destination; in various examples, the NACL could specify TCP only, or all ports, or only port 22, port 443, port 80, etc. The values of allowable ports and protocols are collected and added to an entry in the affected resource list to enable review later.

In an embodiment, the threat assessment server 112 is programmed to next examine the route table attached to the subnet of the source EC2. To constitute a vulnerability, the route table must have a route whose destination CIDR block contains or matches the IP address of the destination EC2.

A matching entry will specify a target of the route. The target of the route could direct traffic to several different networking constructs such as a NAT Gateway, Transit Gateway, VPC peering connection, a VPC endpoint connection, or other targets. For purposes of illustrating a clear example, this disclosure assumes that the target of the route is the local VPC. In such a case, the threat assessment server 112 is programmed to fetch a value of a default VPC for the route table, and to fetch values for all the subnets within that VPC. In an embodiment, the threat assessment server 112 is programmed to analyze each subnet to determine which CIDR block of which subnet contains the IP address of the destination EC2.

After identifying a particular subnet, the threat assessment server 112 is programmed to analyze the NACL that is attached to the particular subnet and having a CIDR block that matches the destination IP. To constitute a vulnerability, the NACL must have an inbound rule that explicitly allows traffic from the IP address of the source EC2.

Upon completing the foregoing steps, when all the stated tests pass, the threat assessment server 112 is programmed to determine that network traffic can be set from the IP address of the source EC2 to the IP address of the destination EC2, on certain protocols and ports as determined or specified by the security group and NACL rules. As shown in block 322, based on the inspection of the rules, the threat assessment server 112 is programmed to create a second list of source resources, destination resources, protocols and ports on which network traffic is possible.

The foregoing steps can be executed for every resource within a specified cloud service account. The result is a list or map of all resources that are accessible from a specific entry point or ARN. Data in the list can be used to create and digitally store, or visually display, a tree or graph of nodes representing resources and connected by edges representing logical network connectivity. Thus, in an example graph, a node can represent any source node and edges represent the capability to send network traffic, based on the foregoing tests, to a destination node to which the edge connects. Data from the list also can be used to construct a folder-like view in which a root folder represents a source resource and child elements or folders represent reachable destination resources.

Both the first list and the second list often will contain many of the same resources based on different kinds of access. At block 324, the threat assessment server 112 is programmed to join or combine both results into one list. Block 324 can comprise de-duplicating entries found within both lists and combining their data sets, the allowable actions from IAM permissions and the steps that comprise the network path between the source and destination, to produce a final score used to prioritize specific resources.

At block 326, the threat assessment server 112 is programmed to score entries within the list. In an embodiment, the threat assessment server 112 is programmed to create and store a score value for each reachable service; a score value can comprise an algorithmic combination, blend, or weighting of values representing a permissions level (read/write/both), the ability to create new service instances (which can drastically increase costs), degrees from origin, and others. In an embodiment, resources receive a higher score based on how logically close they are to an entry point identifier and how damaging the set of allowable actions could be, such as write access to data or the ability to delete instances. Each score value can represent a relative priority concerning the need to remediate the vulnerability of the associated resource.

At block 328, the threat assessment server 112 is programmed to create and cause rendering one or more 2D or 3D visualizations of the joined list and/or resources in the joined list. In some embodiments, the final list produced at block 324 can form input for a 3D network visualization service and/or a table view.

In some embodiments, the source lists, joined lists, and/or updates to the lists occur continuously and/or on a streaming basis as the process of FIG. 3 generates data specifying potentially affected resources. Thus, the process of FIG. 3 is not required to execute on a strictly ordered basis in which a table or other visualization is not produced until all steps execute. Instead, as intermediate steps yield data specifying potentially affected resources, a data table or other visualization can be constructed and displayed. FIG. 4B illustrates an example computer display device that has rendered a portion of a 2D visualization of affected resources. In an embodiment, computer display device 400 receives presentation instructions that render an account name report in a graphical user interface window 420. In the example of FIG. 4B, the window 420 comprises a header panel 422 that displays data identifying the cloud service account and entry point identifier that have been used to initiate analysis, a starting time, an elapsed time, and a status value. Window 420 can further comprise a search box 424 that is programmed to receive a search query directed at data that appears in a table panel 428. In the example of FIG. 4B, the table panel 428 is not yet populated with data; therefore, an interstitial message 429 specifies that data analysis is underway. Other controls 426 for filtering or adjusting the data of the table panel can be programmed as part of the window 420.

FIG. 4C illustrates the computer display device of FIG. 4B that has rendered a further portion of a 2D visualization of affected resources. In the example of FIG. 4C, the table panel 428 comprises a visual table of resources, each resource in a row, each row specifying values for a plurality of column attributes 431. In one embodiment, the column attributes 431 can comprise an identifier of a resource, a degrees value specifying a logical distance of the resource from the entry point, a number of resources that the resource of the row can access, a number of resources that access the resource of the row, one or more access type values specifying means that other resources can access the resource of the specified row, a risk score value, and display controls. In one embodiment, a degree icon 429 specifies, for each resource identified in a row, a magnitude of distance or degree of logical separation from the entry point resource, which is identified in a header panel 421 in a SEARCHED ARN identifier 427.

Further, each degree icon 429 can specify a group within a hierarchy of groups. For example, a particular value of the magnitude of degree, like "1," "2," or "3," also can label a group bar that contains multiple resources of other groups, such as compute, networking or storage. In one embodiment, table panel 428 can be programmed with one or more group bars 430 which can be toggled via user input to show or hide resources that correspond to a category label of the group bar. In the example of FIG. 4C, a first group bar 430 for networking resources is expanded, and while the process of FIG. 2, FIG. 3 has discovered 7 compute resources, rows corresponding to five of those compute resources are shown and two are hidden. A second group bar for storage resources could be provided and expanded to show two resource rows 434 each having data for a different storage resource.

Further, in FIG. 4C, the window 420 is programmed, in response to user input to select a GROUP BY control 426, to display a pull-down menu of grouping controls specifying that grouping of rows in the table panel 428 can occur by resource type, degrees of separation, or with no grouping. In an embodiment, the window 420 is programmed to display one or more group bars 430, and to group resource rows with them, only when the GROUP BY control 426 is selected and the RESOURCE TYPE option is selected in pull-down menu 436. In an embodiment, selecting the DEGREES option of the pull-down menu causes the window 420 to display group bars that are labeled DEGREE 1 or DEGREE 2 and to group resource rows with corresponding degree values within or below the group bars. Selecting DON'T GROUP in the pull-down menu causes the window 420 to update without any group bars 430. In an embodiment, controls 426 also can include a SORT BY control that is programmed to enable sorting resource rows of the table 428 based only of the column headings.

Figure 4F:
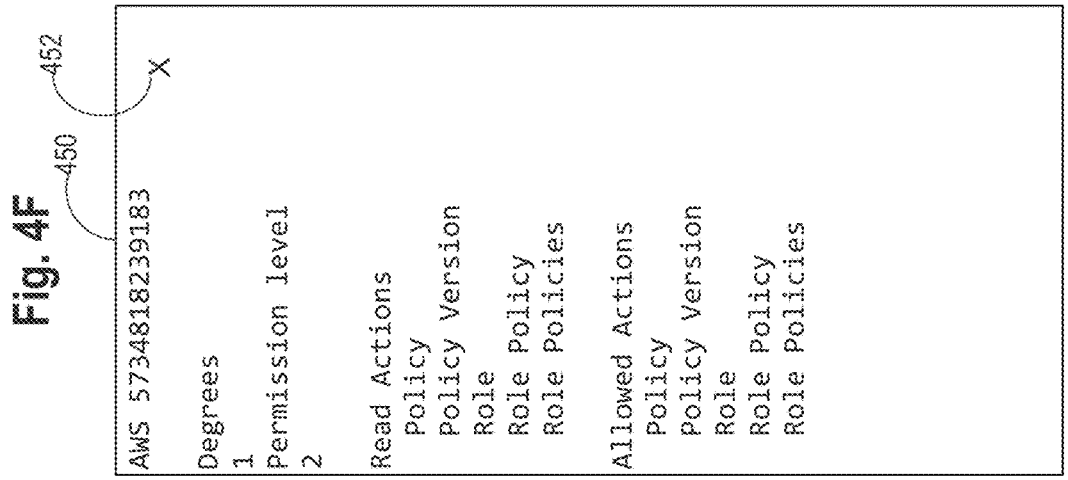
FIG. 4F illustrates an example detail window.

In another embodiment, resource row table displays like those in any of FIG. 4C, FIG. 4D can be programmed with a selectable control to cause displaying a pop-up window to show detailed data values concerning any row in the table. FIG. 4D, FIG. 4F illustrate example detail windows. Referring first to FIG. 4D, in one embodiment, selecting a row using one of the display controls (FIG. 4C) or using a double-click in a row causes displaying a rule detail window 440 superimposed on or overlaying the table panel 428. In an embodiment, the rule detail window 440 comprises a resource identifier 442 that identifies the selected resource. The rule detail window 440 can be programmed with a plurality of data tabs 450, 451, the selection of which causes displaying different data in the remainder of the window. In the example of FIG. 4D, a first data tab 450 labeled NETWORK ACCESS is selected and a second tab 452 labeled IAM ACCESS is de-selected. In response to selecting the first data tab 450, the rule detail window 440 is programmed to display one or more rule panels 444, 446, 448 and to populate the rule panels with detailed data from security group rules that formed the basis of including the resource of identifier 442 in the table panel 428. In this manner, the user can efficiently and rapidly obtain a view of an explanation of why a resource in the table panel 428 has been included.

In the example of FIG. 4F, a GUI window 450 or panel can be display on, over, near, or adjacent to the GUI window 420 of FIG. 4C, FIG. 4D, in response to user input selecting a row in one of the table panels 428. In an embodiment, window 450 displays all relevant data values for a resource that had been identified. Thus, while not all data might be visible in a resource row of a table panel 428, based on screen size requirements or the number of data values, selecting a row to display window 450 will show all relevant data values. A CLOSE control 452 can be provided and programmed, in response to selection, to close the window 450.

Figure 4E:
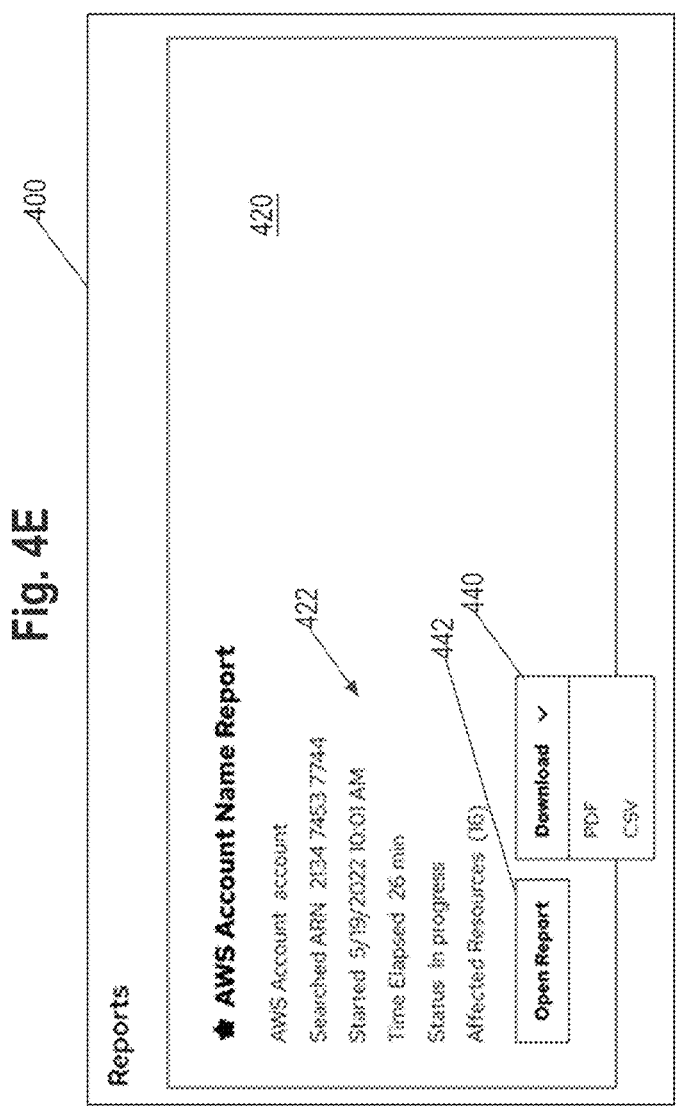
FIG. 4E illustrates the computer display device and a portion of the GUI of FIG. 4B, FIG. 4C, FIG. 4D with a report generating control.

FIG. 4E illustrates the computer display device and a portion of the GUI of FIG. 4B, FIG. 4C, FIG. 4D with a report generating control. In an embodiment, GUI 420 on computer display device 400 can be programmed to provide a download control 440 which, when selected, causes the system to generate and cause downloading a report similar in form to the window 420 of FIG. 4B, FIG. 4C, FIG. 4D and showing a table of resource rows. Additionally or alternatively, window 420 can be programmed to provide an OPEN REPORT widget which, when selected, causes displaying a report with more detail than shown in FIG. 4B, FIG. 4C, FIG. 4D.

Referring again to FIG. 3, at block 330, the threat assessment server 112 is programmed to execute one or more updates to the rules, policies, or roles, or create new role, and deploy the updates in the cloud service using one or more calls to cloud service tools, to change access to vulnerable resources. In one embodiment, using a 2D or 3D visualization of the data, the threat assessment server 112 is programmed to receive user input specifying a particular resource that is represented in the visualization and request an remediation of one or more issues by altering the policies attached to a specific role. For example, IAM Policy 152 of IAM Role 150 of a compute instance 106 can be modified. In one embodiment, the threat assessment server 112 is programmed to use Infrastructure as Code (IaC) to alter the policies 152 of a pre-existing role 150, or create a new role, which will be deployed in the cloud provider account 108 and/or managed network 104 using cloud native tools, such as CLOUDFORMATION for AWS. Therefore, block 330 can be programmed to enable the user computer 114 to address issues within the same graphical user interface as the 2D or 3D visualizations of the assessment data.

Embodiments offer numerous benefits and improvements over other approaches. For example, while AMAZON provides an IAM policy simulator through an SDK, but calling the simulator requires specifying an IAM role, list of actions, and ARN; the simulator returns a result specifying whether any of the actions in the list is allowable on the specified role. However, using the policy simulator for a complex set of computing instances, storage instances, roles, and policies typically requires an excessive number of network calls, such as individual calls for thousands of services and hundreds of actions, requiring many hours to run and receive results. Timing of this kind is impractical, and the process requires excessive use of network bandwidth and client processing cycles.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
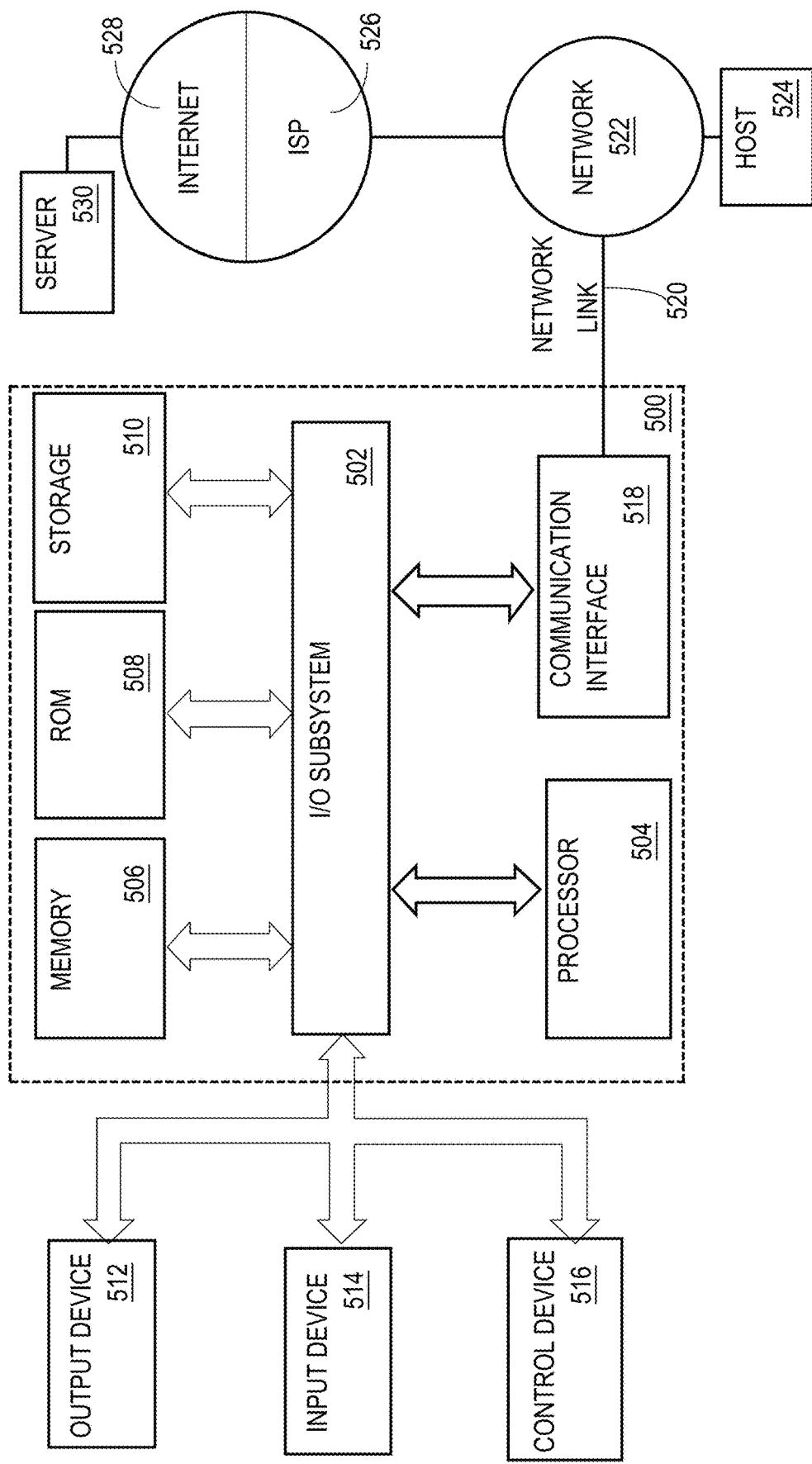
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations. Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments). As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a threat assessment server that is communicatively coupled via one or more networks to one or more different cloud computing service providers, the method comprising:
   receiving first input data specifying a first cloud service account that is associated with two or more cloud computing instances or two or more cloud storage instances, the two or more cloud computing instances or two or more cloud storage instances being hosted at a first cloud computing service provider, the first cloud service account being from among one or more different cloud service accounts that are associated with the one or more different cloud computing service providers each hosting respective cloud computing instances or cloud storage instances;
   receiving second input data specifying an entry point identifier of a particular cloud resource from among the two or more cloud computing instances or two or more cloud storage instances;
   using a plurality of first network calls from the threat assessment server to the first cloud computing service provider, accessing an Identity and Access Management (IAM) role that is associated with the particular cloud resource and accessing one or more policies that are attached to the IAM role, the one or more policies specifying one or more other resources and one or more actions that are allowable with the one or more other resources;
   based on the one or more other resources and the one or more actions, digitally creating and storing a first entry in a first list of affected resources that is stored in main memory of the threat assessment server;
   recursively executing a plurality of second network calls to access one or more other IAM roles and one or more other policies of the one or more other resources, and updating the first list of affected resources to create one or more second entries based on one or more service control policies that are associated with the first cloud service account;
   inspecting one or more networking rules defined in the first cloud service account to determine if network traffic is possible between a first resource and a second resource specified in the first list of affected resources, and based on the inspection, digitally creating and storing a second list of source resources, destination resources, protocols and ports on which network traffic is possible;
   joining the first list of affected resources and the second list and de-duplicating entries to create and store a joined list;
   based on the joined list, executing one or more updates to the networking rules to change access to one or more vulnerable resources in the joined list, and deploying the updates using one or more calls from the threat assessment server to cloud service tools of the cloud service provider.

2. The method of claim 1, wherein inspecting one or more networking rules comprising inspecting one or more security group rules, network access control list rules, subnet CIDR blocks, and route table routes, and wherein executing one or more updates to the networking rules comprises executing one or more updates to the security group rules, network access control list rules, or IAM policies.

3. The method of claim 1, wherein executing one or more updates to the networking rules comprises creating and storing a new IAM policy of an IAM role.

4. The method of claim 1, further comprising executing one or more second network calls from the threat assessment server to the first cloud computing service provider and receiving, in response, a plurality of metadata for the two or more computing instances or the two or more storage instances.

5. The method of claim 1, the entry point identifier comprising an Amazon Resource Name (ARN).

6. The method of claim 1, further comprising performing the recursively executing only until a logical distance of one of the one or more other resources to the entry point identifier equals a specified degree value.

7. The method of claim 6, the specified degree value being between "2" and "9".

8. The method of claim 1, further comprising:
creating and storing a score value for each resource entry in the joined list;
sorting the joined list based on a magnitude of the score value of each resource entry;
performing the executing one or more updates in a priority order based on the score value of each resource entry.

9. The method of claim 1, further comprising, continuously on a streaming basis as the first list is updated, as the second list is created, and as the first list and second list are joined, creating and transmitting, to a user computer, presentation instructions which when rendered using the user computer cause the user computer to display a table of data for entries of resources in the first list, second list, or joined list, the table being updated continuously until the method completes.

10. The method of claim 1, further comprising updating the networking rules to change network access of one resource to another resource.

11. A computer system comprising a threat assessment server that is communicatively coupled via one or more networks to one or more different cloud computing service providers, one or more processors, and one or more non-transitory computer-readable media that are communicatively coupled to the one or more processors and storing one or more sequences of stored program instructions which, when executed using the one or more processors, cause the one or more processors to perform:
receiving first input data specifying a first cloud service account that is associated with two or more cloud computing instances or two or more cloud storage instances, the two or more cloud computing instances or two or more cloud storage instances being hosted at a first cloud computing service provider, the first cloud service account being from among one or more different cloud service accounts that are associated with the one or more different cloud computing service providers each hosting respective cloud computing instances or cloud storage instances;
receiving second input data specifying an entry point identifier of a particular cloud resource from among the two or more cloud computing instances or two or more cloud storage instances;
using a plurality of first network calls from the threat assessment server to the first cloud computing service provider, accessing an Identity and Access Management (IAM) role that is associated with the particular cloud resource and accessing one or more policies that are attached to the IAM role, the one or more policies specifying one or more other resources and one or more actions that are allowable with the one or more other resources;
based on the one or more other resources and the one or more actions, digitally creating and storing a first entry in a list of affected resources that is stored in main memory of the threat assessment server;
recursively executing a plurality of second network calls to access one or more other IAM roles and one or more other policies of the one or more other resources, and updating the list to create one or more second entries based on one or more service control policies that are associated with the first cloud service account;
inspecting one or more networking rules defined in the first cloud service account to determine if network traffic is possible between a first resource and a second resource specified in the list of affected resources, and based on the inspection, digitally creating and storing a second list of source resources, destination resources, protocols and ports on which network traffic is possible;
joining the first list and the second list and de-duplicating entries to create and store a joined list;
based on the list, executing one or more updates to the networking rules to change access to one or more vulnerable resources in the joined list, and deploying the updates using one or more calls from the threat assessment server to cloud service tools of the cloud service provider.

12. The computer system of claim 11, wherein the instructions for inspecting one or more networking rules comprise sequences of instructions which, when executed using the one or more processors, cause the one or more processors to perform inspecting one or more security group rules, network access control list rules, subnet CIDR blocks, and route table routes, and wherein the instructions for executing one or more updates to the networking rules comprise sequences of instructions which, when executed using the one or more processors, cause the one or more processors to perform executing one or more updates to the security group rules, network access control list rules, or IAM policies.

13. The computer system of claim 11, wherein the instructions for executing one or more updates to the networking rules comprise sequences of instructions which, when executed using the one or more processors, cause the one or more processors to perform creating and storing a new IAM policy of an IAM role.

14. The computer system of claim 11, further comprising sequences of instructions which, when executed using the one or more processors, cause the one or more processors to perform one or more second network calls from the threat assessment server to the first cloud computing service provider and to receive, in response, a plurality of metadata for the two or more computing instances or the two or more storage instances.

15. The computer system of claim 11, the entry point identifier comprising an Amazon Resource Name (ARN).

16. The computer system of claim 11, further comprising sequences of instructions which, when executed using the one or more processors, cause the one or more processors to perform the recursively executing only until a logical distance of one of the one or more other resources to the entry point identifier equals a specified degree value.

17. The computer system of claim 16, the specified degree value being between "2" and "9".

18. The computer system of claim 11, further comprising sequences of instructions which, when executed using the one or more processors, cause the one or more processors to perform:
creating and storing a score value for each resource entry in the joined list;
sorting the joined list based on a magnitude of the score value of each resource entry;
performing the executing one or more updates in a priority order based on the score value of each resource entry.

19. The computer system of claim 11, further comprising, continuously on a streaming basis as the first list is updated, as the second list is created, and as the first list and second list are joined, creating and transmitting, to a user computer, presentation instructions which when rendered using the user computer cause the user computer to display a table of data for entries of resources in the first list, second list, or joined list, the table being updated continuously until the method completes.

20. The computer system of claim 11, wherein the instructions for executing one or more updates to the networking rules comprise sequences of instructions which, when executed using the one or more processors, cause the one or more processors to perform updating the networking rules to change network access of one resource to another resource.

\* \* \* \* \*